Sept. 8, 1942.  E. T. ARTERS  2,295,377
BUS STRUCTURE
Filed May 14, 1941
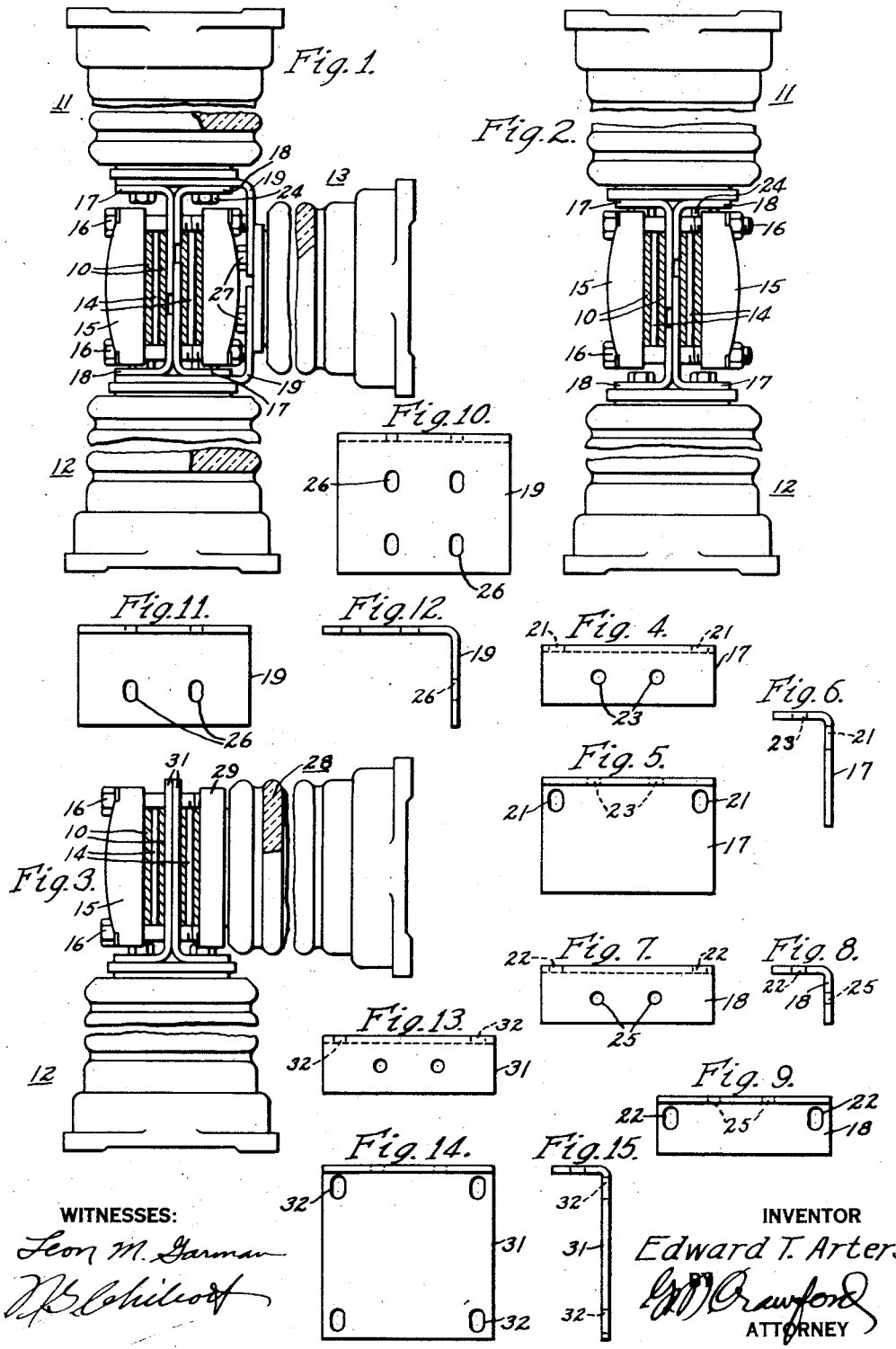
WITNESSES:
Leon M. Garman
INVENTOR
Edward T. Arters.
ATTORNEY Patented Sept. 8, 1942

2,295,377

UNITED STATES PATENT OFFICE 2,295,377

BUS STRUCTURE

Edward T. Arters, Wilkinsburg, Pa., assignor to Westinghouse Electric & Manufacturing Company, East Pittsburgh, Pa., a corporation of Pennsylvania Application May 14, 1941, Serial No. 393,333

5 Claims. (Cl. 174—70)

My invention relates, generally, to supporting structures and, more particularly, to structures for supporting bus bars.

In electric power systems it is customary to utilize two-point and three-point bus supports to provide increased strength for buses of systems having high short-circuit currents. The bus supports are usually located in masonry compartments. In the construction of masonry compartments, it is almost impossible to procure perfect uniformity. Therefore, in order to secure alignment of the bus bars, it is necessary to provide a means of adjustment for the supports. In the past, spacers of various types have been utilized between the base of the support and the masonry surface to compensate for the unevenness of the structure. However, this method is not entirely satisfactory as it is difficult to secure the exact amount of adjustment required for different conditions.

An object of my invention, generally stated, is to provide a bus support which shall be simple and efficient in operation and which may be economically manufactured and installed.

A more specific object of my invention is to provide a bus support which may be readily adjusted.

Another object of my invention is to provide two- and three-point bus supports which have a means of adjustment at the bus bar and permit the base of the support to be secured directly to the surface of the masonry bus compartment.

Other objects of my invention will be explained fully hereinafter or will be apparent to those skilled in the art.

In accordance with my invention, adjustment of two-point and three-point bus supports is obtained by means of slotted brackets which are so designed as to insure a firm support, maintain proper and uniform spacing of the conductor bars and at the same time provide flexibility of adjustment for uneven bus compartment surfaces.

For a fuller understanding of the nature and objects of my invention, reference may be had to the following detailed description, taken in conjunction with the accompanying drawing, in which:

Figure 1 is a view, in elevation, of a three-point bus support embodying my invention;

Fig. 2 is a view, in elevation, of a two-point bus support;

Fig. 3 is a view, in elevation, of another two-point support;

Figs. 4, 5, and 6 are views in plan, side and end elevation, respectively, of one of the adjustable brackets utilized in Figs. 1 and 2;

Figs. 7, 8 and 9 are similar views of another bracket utilized in Figs. 1 and 2;

Figs. 10, 11, and 12 are similar views of still another bracket utilized in Figs. 1 and 2; and Figs. 13, 14 and 15 are similar views of a bracket utilized in Fig. 3.

Referring to the drawing, and particularly to Fig. 1, the bus structure shown therein comprises a plurality of bus bars 10 which are supported by three insulating supports 11, 12, and 13. The supports 11 and 12 are disposed opposite each other, and the support 13 is disposed at right angles to the supports 11 and 12, thereby providing a three-point support for the bus bars 10. The bases of the supports 11, 12, and 13 may be secured to walls of a masonry compartment (not shown) in any suitable manner. Suitable spacers 14 are provided between the bus bars 10 which are clamped together by a pair of clamping members 15 drawn together by bolts 16.

In order to provide an adjustment for variations in the surfaces of the bus compartment, angle-shaped brackets 17 and 18 are provided for securing the bus bars to the supports 11 and 12. Additional brackets 19 may be utilized for connecting the support 13 to the supports 11 and 12 and the bus bars 10.

As shown in Figs. 4, 5, and 6, the angle brackets 17 are provided with elongated openings or slots 21 for the bolts 16. Likewise, the brackets 18, shown in Figs. 7, 8, and 9, are provided with similar elongated openings 22 for the bolts 16. The shorter legs of the angle brackets 17 are provided with holes 23 through which bolts 24 are inserted to secure the brackets to the insulating supports 11 and 12. Similar holes 25 are provided in the brackets 18 for securing them to the insulating supports by means of the bolts 24.

In the structure shown in Fig. 1, the brackets 17 and 18 are adjusted for a depression in the top surface of the bus compartment. Thus, the upper brackets 17 and 18 are raised above their normal position to compensate for unevenness of the top surface of the compartment. Since the brackets are clamped between the bus bars 10 by means of the bolts 16 and clamps 15, either pair of brackets may be raised or lowered by loosening the bolts 16 and sliding the brackets in the desired direction. The limits of adjustment are determined by the length of the elongated openings in the brackets.

In order to compensate for variations in the side of the bus compartment to which the support 13 is secured, the angle brackets 19 are provided for connecting the bus bars to the support 13. As shown in Figs. 10, 11, and 12, elongated openings 26 are provided in both legs of the angle brackets 19. Thus, the brackets 19 may be adjustably connected to the supports 11 and 12 by means of the bolts 24 to permit variations of the support 13 in a horizontal plane. Likewise, the brackets 19 may be adjustably connected to the support 13 by bolts 27 to compensate for variations of the supports 11 and 12 in a vertical plane. In this manner a three-point support is provided which secures perfect alignment of the bus bars and permits unevenness of the surfaces of the bus compartment.

In the two-point support illustrated in Fig. 2, the brackets 17 and 18 are adjusted for a depression in the surface on which the support 12 is mounted. The adjustment is made in the same manner as hereinbefore explained in the description of the structure shown in Fig. 1.

A right angle two-point support is illustrated in Fig. 3 in which the bus bars 10 are secured directly to an insulating support 28 by means of the bolts 16. A spacing member 29, into which the bolts 16 are screwed, is provided on the support 28. A pair of angle brackets 31 having elongated openings 32 for the bolts 16 are provided for securing the bus bars 10 to the support 12. The brackets 31 may be adjusted in the manner hereinbefore described for unevenness in the surface on which the support 12 is mounted.

From the foregoing description, it is apparent that I have provided a bus structure which is particularly suitable for mounting in masonry compartments where unevenness in the masonry surface is encountered. However, the structure herein described may be readily utilized in compartments of other types.

Since many modifications may be made in the apparatus and arrangement of parts without departing from the spirit of my invention, I do not wish to be limited other than by the scope of the appended claims.

I claim as my invention:

1. A bus structure comprising, a plurality of insulating supports, a bus bar, a plurality of right angle brackets for adjustably securing the bus bar to the supports, said brackets having elongated openings therein for connection to the bus bar and the supports, and clamping means cooperating with said openings to adjustably secure the brackets to the bus bar.

2. A bus structure comprising, a plurality of insulating supports, a plurality of bus bars, a plurality of slotted brackets for adjustably securing the bus bars to the supports, said brackets being adjustably clamped between the bus bars, and clamping means for securing the brackets and the bus bars together.

3. A bus structure comprising, a plurality of insulating supports, a plurality of bus bars, a plurality of angle brackets for adjustably securing the bus bars to the supports, said brackets having one leg adjustably clamped between the bus bars, and clamping means for securing the bracket and the bus bars together.

4. A bus structure comprising, a plurality of insulating supports, a plurality of bus bars, a plurality of angle brackets for adjustably securing the bus bars to the supports, said brackets having one leg adjustably clamped between the bus bars, and clamping means for securing the bracket and the bus bars together, said legs having elongated openings therein for said clamping means.

5. A bus structure comprising, a pair of oppositely disposed insulating supports, a plurality of bus bars, a plurality of angle brackets for adjustably securing the bus bars to the supports, said brackets having one leg adjustably clamped between the bus bars, clamping means for securing the brackets and the bus bars together, said legs having elongated openings therein for said clamping means, an additional insulating support disposed in angular relation to said pair of supports, and additional brackets for adjustably connecting said additional support to said first-named supports.

EDWARD T. ARTERS.